Feb. 13, 1951      L. McGIHON      2,541,264
JUICE EXTRACTOR
Filed Feb. 10, 1948      2 Sheets-Sheet 1
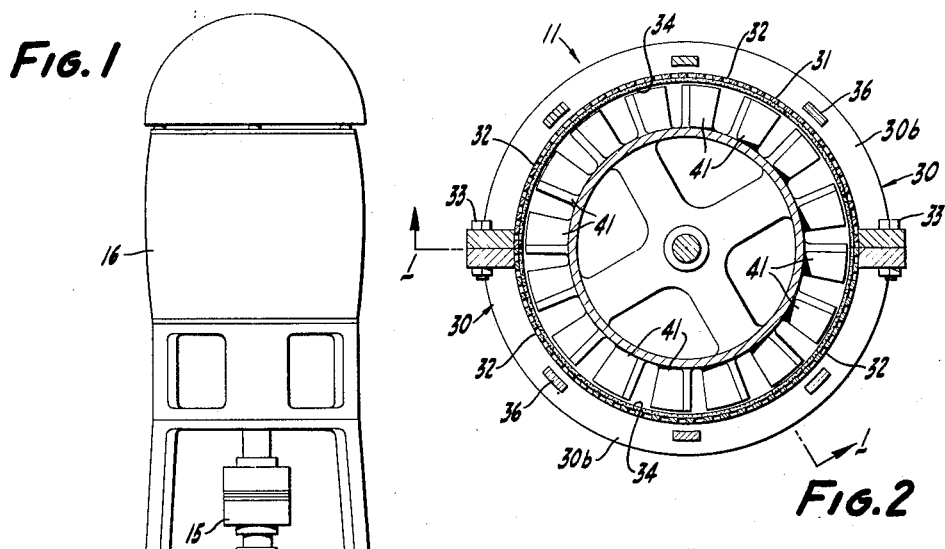
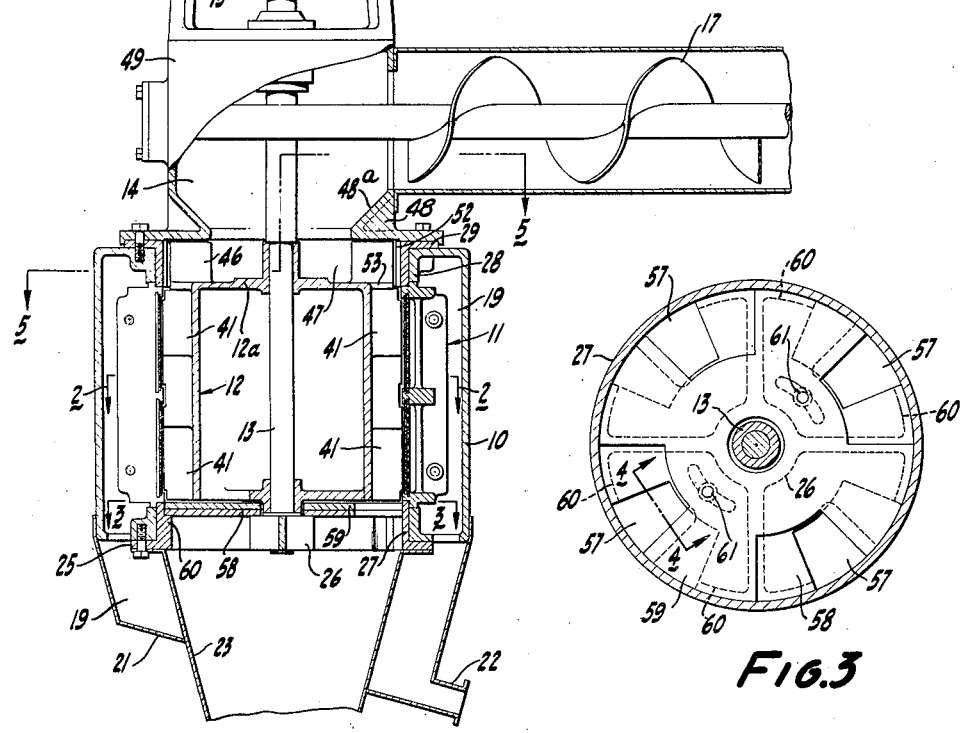
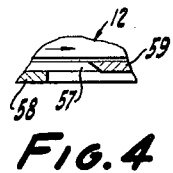
INVENTOR.
LEONARD McGIHON
BY
*Harper Allen*
ATTORNEY Feb. 13, 1951 L. McGIHON 2,541,264
JUICE EXTRACTOR
Filed Feb. 10, 1948 2 Sheets-Sheet 2

INVENTOR.
LEONARD McGIHON
BY
ATTORNEY

Patented Feb. 13, 1951

2,541,264

UNITED STATES PATENT OFFICE 2,541,264

JUICE EXTRACTOR

Leonard McGihon, San Leandro, Calif., assignor to King Sales & Engineering Co., San Francisco, Calif.

Application February 10, 1948, Serial No. 7,457

6 Claims. (Cl. 146—76)

This invention relates to the extraction or preparation from fruits and vegetables of products such as juices and purees, and is concerned more particularly with the provision of fruit and vegetable products containing desired portions of comminuted or finely divided pulp.

It is a general object of the invention to provide improved methods and apparatus for extracting fruit and vegetable products containing juice and pulp.

Another object of the invention is to provide methods and apparatus of the above character which provide improved feeding and flow of the material through the machine.

A further object of the invention is to provide methods and apparatus of the above character in which the amount of material held in the preliminary breaking chamber of the machine during processing is substantially reduced over prior equipment and methods.

Other objects and advantages of the invention will be apparent from the following description of certain preferred embodiments taken in conjunction with the accompanying drawings, in which:

Figure 1 is a side elevational view of an extractor partially in section.

Figure 2 is a horizontal sectional view taken as indicated by the line 2—2 in Figure 1.

Figure 3 is a horizontal sectional view taken as indicated by the line 3—3 in Figure 1.

Figure 4 is a fragmentary section taken as indicated at 4—4 in Figure 3.

Figure 5:
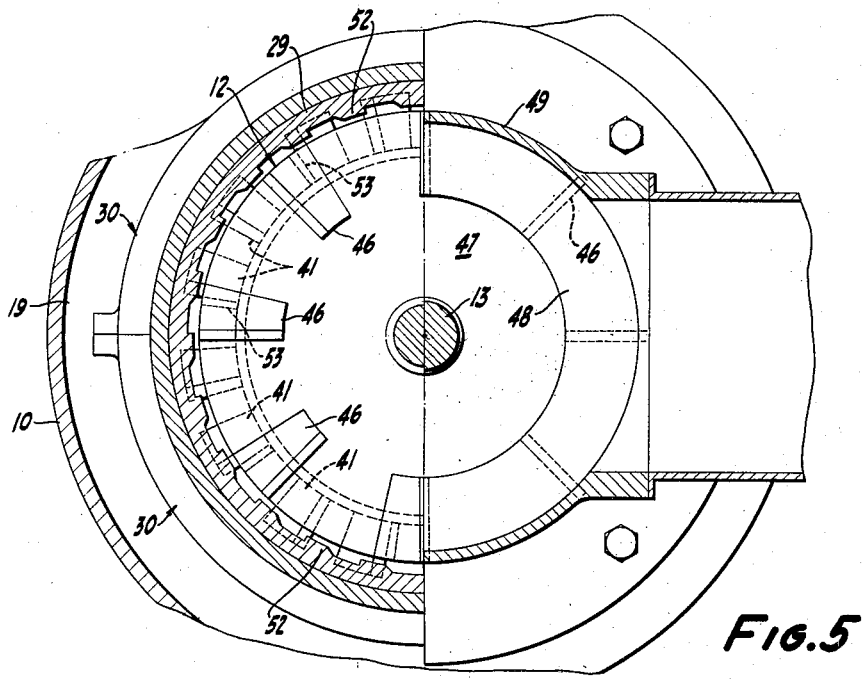
Figure 5 is a horizontal sectional view taken in planes indicated by the lines 5—5 in Figure 1.

Referring to the drawings, the extractor comprises an upright main frame or casting 10 carrying a screen assembly 11 and a rotor 12 within the screen assembly. The upright drive shaft 13 for the rotor 12 extends upwardly through a material feeding and breaking chamber 14 and is connected by a coupling 15 with a driving motor 16. A suitable form of screw feed mechanism 17 is adapted to feed material into the chamber 14. Around the screen assembly 11 and within the casting 10, there is provided a sealed juice or puree outlet chamber 19 closed at the bottom by an inclined bottom wall 21 and having a discharge pipe 22 leading therefrom. At the lower end of the rotor 12 a discharge funnel 23 is provided for waste material.

As seen in Figure 1, the frame 10 supports at its lower portion a base casting having an annular L-shaped outer rim 25 connected by suitable spokes to a central boss 26 for journalling of the rotor shaft 13. The annular rim 25 also serves to center the lower end of the screen assembly 11 which rests on a seat 27 of the casting 10. At the top, the frame 10 is provided with an annular boss 28 within which an L-shaped aligning ring 29 for the screen frame assembly 11 is suitably mounted. The ring 29 also forms the outer wall of the feeding and breaking chamber 14.

Referring to Figures 2 and 3, the screen frame assembly 11 comprises a pair of semi-cylindrical outer screen frames 30 which are provided with suitable semi-annular grooves to receive the screen backing members 31 and the screen 34. The backing members 31 are formed of sheet metal and are provided with relatively large openings 32. Each screen frame is provided with three semi-annular ribs 30a, 30b and 30c, respectively, and with three vertical bars 36. The flanged edges of the screen frames 30 are secured together by bolts 33. It will be noted that the construction of the screen assembly leaves the inner surface of the screen substantially completely exposed. The screen 34 may be formed of suitable material, such as bronze, stainless steel or an acid-resistant rubber, and is provided with perforations in the order of from 6400 to 430 per square inch so that sizes of the individual openings are in the order of from .004 inch to .023 inch.

The rotor 12 comprises a cylindrical casting having a counter-balanced array of impact and progressor blades 41 cast integrally therewith in three vertically arranged staggered series. The leading edges of these blades 41 are spaced from the screen by an appropriate amount in the order of 1/8 inch for an 18 inch inner diameter of the screen so that they impact the material and carry it past the screen without wiping against the screen.

The top wall 12a of the rotor 12 forms the bottom of the breaking chamber 14 and has integrally formed thereon an annular array of breaking blades 46 which are spaced about a central material receiving chamber 47 to which the frusto-conical wall 48a of the casting 48 leads from the discharge opening of the screw feed. The wall 48a and the associated part of the casting overlie the blades 46, forming a baffle so that all of the material from the feed screw is directed downwardly through the annular central feeding opening defined by the bottom of the casting 48 to the center space 47 and then feeds radially outward between the blades 46 and is ground to the desired fineness between the blades and the comminuting teeth 52 formed on the ring 29.

In order to permit the easy flow of juice extracted during the preliminary breaking up of the material by the blades 46, a narrow slot 53 is provided immediately in front of each blade leading inwardly from the periphery of the outwardly projecting annular rim of the top rotor wall 12a overlying the space between the rotor 12 and the screen structure 11. These slots are of less width than the spacing between the edge of the blades 46 and the roots of the teeth 52 so that no solids material as large as the particles formed by the comminuting means can be fed through these slots into the juice extracting zone between the rotor 12 and the screen.

Figures 6, 7:
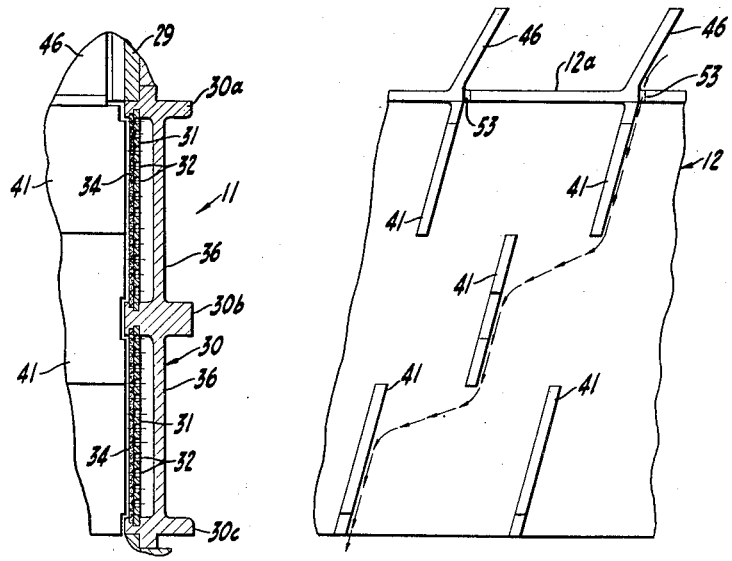
Figure 6 is an enlarged sectional view similar to Figure 1 of a portion of the screen assembly.
Figure 7 is a developed view of the rotor and the material impacting and progressing blades thereon.

The material ground between the teeth 52 and the breaker blades 46 is fed downwardly through the annular slot formed between the top wall 12a of the rotor 12 and the ring 29 as an annular sheet of material. As shown in Figure 6, the material progresses from blade to blade of the staggered series of hammer or juice extracting blades 41. These blades serve to impact and carry the material around the screen, and to re-arrange and loosen it as it progresses from one set of blades to the next so that the material is gradually worked to a finely pulped condition. The juice and fine pulp particles are passed through the screen by centrifugal action and are discharged through the chamber 19.

The pulpy material which will not pass through the screen is discharged at the bottom of the rotor 12 and the screen. Note that there is substantially a straight line flow downwardly along the screen and past the lower end of the screen so that the refuse material need not move inwardly against centrifugal force. At the bottom of the screen, the material is led into one of a series of discharge slots 57 between the respective spider-shaped plates 58 and 59. The plate 58 is secured in any suitable manner to the bottom casting 25 and rests on ledges 60 formed integrally with the casting 25. The plate 59 is adjustably secured by means of screws 61 to the plate 58 so that the width of the slot can be adjusted or it can be closed.

In general the operation of the rotor blades and the screen in the extraction operation is similar to that disclosed and claimed in my copending application Serial No. 682,241 filed July 9, 1946, for Processing Apparatus and Method.

With reference to the feeding and preliminary breaking up of the material, one of the principal difficulties in previous machines of this character has been the holding of a large amount of broken material above the preliminary breaking chamber during the entire period of operation of the machine. This is because the breaker blades and chamber construction of conventional design throws material upwardly and causes a general churning or cyclone effect of the partially broken or ground material together with the incoming new material. As a result the entire upper chamber must be kept full in order to obtain a feed of broken material down into the extraction zone.

Inevitably this resulted in some particles of material remaining exposed too long to the oxygen of the atmosphere so that considerable oxidation or browning would take place and a product of undesirable color and taste would result. In contrast to this, with the feeding arrangement of the instant invention the quantity of material being processed in the preliminary breaking chamber is maintained at a minimum. This is true because the material is fed directly into the central space 47 where it is immediately directed radially outwardly of the chamber by centrifugal force past and against the breaker blades 46 for comminution between these blades and the teeth 52. Since the inner diameter of the material receiving space is at least as great as the diameter of the feeding opening defined by the baffle 48, there is a continuous flow of material through the preliminary breaking chamber with substantially no material having an opportunity to be trapped there for a length of time which would result in undesirable color or taste characteristics.

While I have shown a preferred embodiment of the invention it will be understood that the invention is capable of variation and modification from the form shown so that its scope should be limited only by the scope of the claims appended hereto.

I claim:

1. Juice extracting apparatus comprising a cylindrical screen mounted with its axis upright, a rotor within the screen having material impacting blades thereon, means forming a feed and breaking chamber above said rotor having a peripheral opening leading to the upper end of said screen, a series of generally radially arranged breaker blades carried by the rotor and disposed about the periphery thereof within said chamber and having substantially vertical inner edges defining an unobstructed central material receiving space, and a feed structure for directing material into said central space for subsequent centrifugal feeding outwardly past said breaker blades, said feeder structure overlying said blades and having an annular central feeding opening the outer diameter of which is no greater than the outer diameter of said material receiving space, whereby the tops of said blades are shrouded and unexposed to contact with material moving through said apparatus parallel to the axis of said rotor.

2. Juice extracting apparatus comprising a cylindrical screen mounted with its axis upright, a rotor within the screen having material impacting blades thereon, means forming a feed and breaking chamber above said rotor having a peripheral opening leading to the upper end of said screen, a series of generally radially arranged breaker blades carried by the rotor and disposed about the periphery thereof within said chamber and having substantially vertical inner edges defining an unobstructed central material receiving space, and an annular baffle overlying the path of rotation of said blades for directing material into said central space for subsequent centrifugal feeding outwardly past said breaker blades, the inner diameter of said baffle being no greater than the outer diameter of said material receiving space, whereby the tops of said blades are shrouded and unexposed to contact with material moving through said apparatus parallel to the axis of said rotor.

3. Juice extracting apparatus comprising a cylindrical screen mounted with its axis upright, a rotor within the screen having material impacting blades thereon, means forming a feed and breaking chamber above said rotor having a peripheral opening leading to the upper end of said screen, a series of generally radially arranged breaker blades carried by the rotor and disposed about the periphery thereof within said chamber and having substantially vertical inner edges defining an unobstructed central material receiving space, and means for feeding material into said chamber including a baffle overlying the path of rotation of said breaker blades and discharging into said central space inwardly of said blades for subsequent centrifugal feeding outwardly past said breaker blades, the inner diameter of said baffle being no greater than the outer diameter of said material receiving space, whereby the tops of said blades are shrouded and unexposed to contact with material moving through said apparatus parallel to the axis of said rotor.

4. An extractor for fruit and vegetables comprising an upright cylindrical screen, a rotor disposed within the screen and having blades for impacting material as it moves downwardly with respect to the screen, a material breaking chamber above the screen, means providing a restricted annular opening from the breaking chamber to the screen, a series of breaking teeth forming the periphery of said breaking chamber, a series of breaker blades carried by said rotor within said chamber for cooperation with said teeth and spaced closely therefrom, said breaker blades having an inner radial dimension substantially less than the radial dimension of said breaking chamber and terminating in substantially vertical inner edges to provide an unobstructed central feed space therein, and means including a baffle overlying said blades for directing material into said central feed space, the inner diameter of said baffle being no greater than the outer diameter of said central feed space, whereby the tops of said blades are shrouded and unexposed to contact with material moving through said apparatus parallel to the axis of said rotor.

5. An extractor for fruit and vegetables comprising an upright cylindrical screen, a rotor disposed within the screen and having blades for impacting material as it moves downwardly with respect to the screen, a material breaking chamber above the screen, the top wall of said rotor forming the bottom of the chamber and providing a restricted annular opening from the breaking chamber to the screen, a series of breaking teeth forming the periphery of said breaking chamber, a series of breaker blades carried by said rotor for cooperation with said teeth and spaced closely therefrom, said breaker blades having an inner radial dimension substantially less than the radial dimension of said breaking chamber to provide an unobstructed central feed space therein, and means including a baffle overlying said blades for directing material into said central feed space, the inner diameter of said baffle being no greater than the outer diameter of said central feed space and overlying said blades completely, whereby the tops of said blades are shrouded and unexposed to contact with material moving through said apparatus parallel to the axis of said rotor.

6. Juice extracting apparatus comprising a cylindrical screen mounted with its axis upright, a cylindrical rotor mounted within the screen having material impacting blades thereon projecting radially toward the screen, means forming a feed and breaking chamber above said rotor including an annular rim around said rotor to provide a restricted annular opening leading from said chamber to said screen, and a series of substantially vertical breaker blades on said rim in said chamber, a portion of said rim directly overlying the space between said rotor and said screen and being slotted in front of the leading face of at least certain of said blades to pass free juice downwardly from said breaking chamber into said space.

LEONARD McGIHON.

REFERENCES CITED

The following references are of record in the file of this patent:

UNITED STATES PATENTS

| Number | Name | Date |
|---|---|---|
| 1,635,453 | Agnew | July 12, 1927 |
| 2,223,739 | Newton | Dec. 3, 1940 |
| 2,240,213 | Fromm | Apr. 29, 1941 |
| 2,325,426 | Rietz | July 27, 1943 |
| 2,389,862 | McGihon | Nov. 27, 1945 |

FOREIGN PATENTS

| Number | Country | Date |
|---|---|---|
| 115,107 | Germany | Nov. 12, 1900 |